W. H. H. NORCROSS.
TARGETS FOR SHOOTING GALLERIES.
No. 189,321. Patented April 10, 1877.
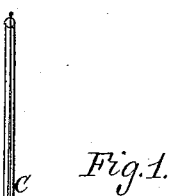
Fig. 1.
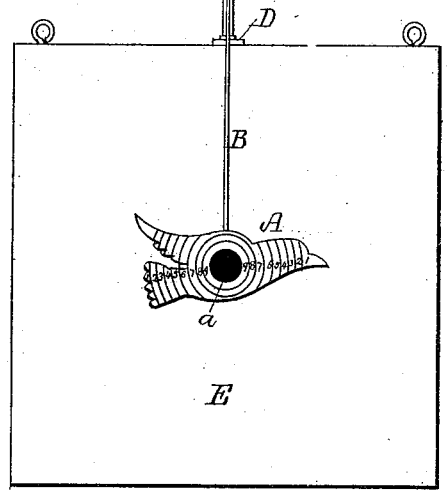
Fig. 3.
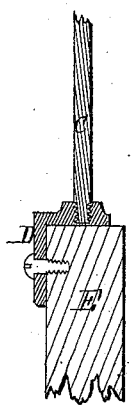
Fig. 2.
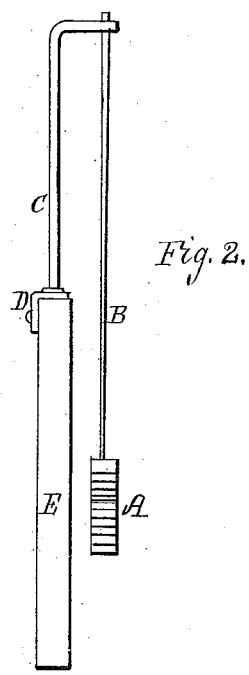
Witnesses.
F. Hunnewell.
W. C. Boardman.
Inventor:
W. H. H. Norcross.
F. Curtis. Atty.

UNITED STATES PATENT OFFICE.

WILLIAM H. H. NORCROSS, OF BOSTON, MASSACHUSETTS.

IMPROVEMENT IN TARGETS FOR SHOOTING-GALLERIES.

Specification forming part of Letters Patent No. 189,321, dated April 10, 1877; application filed January 17, 1877.

*To all whom it may concern:*

Be it known that I, WILLIAM H. H. NORCROSS, of Boston, Suffolk county, Massachusetts, have invented new and useful Improvements in Targets, of which the following is a specification:

The purpose of this invention is to enable proficiency to be attained in shooting on the wing in the field by practice indoors with an air-pistol; and to this end I employ an artificial bird, or other object, suspended by a pendulous rod from a suitable point, in such manner that when put in motion it shall continue for some time to vibrate in arcs of circles of constantly-decreasing extent, a target of a suitable character being inscribed upon the outer side or face of the bird, or other object, to indicate the degree of proficiency of the marksman, after the manner of targets in general.

Details of my invention will be duly explained.

The drawings accompanying this specification represent, in Figure 1, a front face view, and in Fig. 2 a side elevation, of a device embodying my invention. Fig. 3 is a section of the connection between the standard and angle-plate, to be explained.

Reference being had to these drawings, it will be seen that A represents the figure of a bird in flight, the same being secured by its back to the lower end of a flexible rod, B, the upper end of such rod being secured to a proper stationary object, in such manner that when the bird is pushed to one side the inherent elasticity of the rod shall cause a series of reactionary movements of its lower end, and, consequently, of the bird A, in arcs of circles, of which the point of suspension of the rod is the center, the extent of these vibratory movements, as a natural consequence, being constantly lessened until the bird comes to a stop, or until force is applied to compel new movements, It will be seen that the constantly-shortening movements of the bird render the hitting of the latter more difficult than would be the case were these movements of a uniform length.

To provide a compact and portable target for general sale and use, I secure the upper end of the rod B to the top of a bent post, C, the lower end of such post being screw-threaded, and screwing into a metallic right-angled strap or bracket, D, such strap, in turn, being secured to the upper edge of a board, E, in such manner that when the bird A is put in motion it shall swing in front of the said board E. The board E, however, is not necessary, as the shape of the angle-piece, and the manner of connecting it with the post C, is such that it may be readily applied to almost any object where it is desirable to place the target.

The outer face of the bird or object A is provided with a bull's-eye, $a$, and a series of concentric rings, numbered practically after the ordinary manner of targets, and for the same purpose.

I prefer, in practice, to make the bird A of india-rubber in order to enhance its wear, deaden the noise consequent upon the impact of the projectile, and enable the latter to be readily removed.

I claim—

1. A movable target for the practice of "wing-shooting," consisting of a bird, or other object, suspended from a pendulous rod, and bearing the character of a target, substantially as and for the purposes stated.

2. As a complete target for indoor practice, the combination of the swinging target-figure A, suspensory B, post C, angle-piece D, and board E, substantially as and for the purposes stated.

WM. H. H. NORCROSS.

Witnesses:
F. CURTIS,
W. E. BOARDMAN.